(12) United States Patent
Spurling et al.

(10) Patent No.: US 11,597,271 B2
(45) Date of Patent: Mar. 7, 2023

(54) FUEL TANK MOUNTING ASSEMBLY

(71) Applicant: Ford Global Technologies, LLC, Dearborn, MI (US)

(72) Inventors: Michael Spurling, Romford (GB); Robert William Sleath, Wickford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 17/150,442

(22) Filed: Jan. 15, 2021

(65) Prior Publication Data
US 2022/0227224 A1    Jul. 21, 2022

(51) Int. Cl.
*B60K 15/067* (2006.01)
*B60K 15/063* (2006.01)

(52) U.S. Cl.
CPC .... *B60K 15/067* (2013.01); *B60K 2015/0634* (2013.01); *B60Y 2306/01* (2013.01)

(58) Field of Classification Search
CPC .................. B60K 15/067; B60K 6/28; B60K 2015/0634; B60K 2015/0637; B60Y 2306/01; B60Y 2200/92
See application file for complete search history.

(56) References Cited

U.S. PATENT DOCUMENTS

| | | | |
|---|---|---|---|
| 6,347,678 B1 | 2/2002 | Osborn et al. | |
| 7,658,414 B2* | 2/2010 | Watanabe | B60K 15/03 280/834 |
| 2014/0284286 A1* | 9/2014 | Ries | F02M 37/0076 210/136 |
| 2015/0097364 A1* | 4/2015 | Moloney | B60K 15/07 280/834 |
| 2017/0326974 A1* | 11/2017 | Shoji | B60K 15/067 |
| 2019/0283573 A1* | 9/2019 | Lin | B60K 15/063 |
| 2020/0361313 A1* | 11/2020 | Cragel | C09D 5/08 |
| 2021/0362206 A1* | 11/2021 | List Clausen | B60K 15/07 |

FOREIGN PATENT DOCUMENTS

| | | |
|---|---|---|
| CN | 109941096 | 6/2019 |
| CN | 111070639 | 4/2020 |
| WO | WO 2015026013 | 2/2015 |

* cited by examiner

*Primary Examiner* — Kevin Hurley
(74) *Attorney, Agent, or Firm* — Haley Guiliano LLP (57) ABSTRACT

A vehicle fuel tank mounting assembly configured to secure a vehicle fuel tank to a vehicle is described. The assembly comprises a first elongate securing member having at least a first fixing point attachable to a vehicle body. The elongate securing member extends at least partially around the fuel tank in an assembled configuration. The assembly comprises a support member having a first end attachable to the first fixing point, and a second end configured to engage at least one of the elongate member and a wall of the fuel tank at a point remote from the fixing point.

14 Claims, 8 Drawing Sheets

FUEL TANK MOUNTING ASSEMBLY

BACKGROUND

This invention relates to a fuel tank mounting assembly. More particularly, but not exclusively, this invention relates to a fuel tank mounting assembly for a hybrid vehicle having a fuel tank mounted in front of a battery pack.

SUMMARY

Recent packaging solutions for a hybrid vehicle have seen the displacement of a fuel tank towards the front of the vehicle to make space for a rear mounted battery pack. During a frontal collision, the fuel tank may be urged forward due to an internal fluid slosh effect and deceleration impulse of the vehicle, which may cause the fuel tank to impact another portion of the vehicle upon extreme loading conditions. Often, a fuel tank is shaped around an existing body structure cross-member to help prevent movement of the tank. However, the front floor of hybrid vehicles often do not have such structures and therefore load is transferred through the fuel tank mounting straps only. Additionally, it is common for the fuel tank mounting point locations on the vehicle body to be wider than the fuel tank, resulting in undesirable loading of the fuel tank mounting straps during a collision event. A fuel tank mounting assembly is provided herein for improving the safety of the vehicle, e.g., during a collision.

According to examples in accordance with an aspect of the invention, there is provided a vehicle fuel tank mounting assembly. The vehicle fuel tank mounting assembly is configured to secure a vehicle fuel tank to a vehicle. The assembly comprises a first elongate securing member having at least a first fixing point attachable to a vehicle body, e.g., a mounting feature of the vehicle body. The mounting feature may comprise a single mounting point e.g., a first mounting point. The mounting feature may comprise a plurality of mounting points, e.g., the first mounting point and a second mounting point. The elongate securing member extends at least partially around the fuel tank, e.g., around an underside of the fuel tank, in an assembled configuration. The assembly comprises a support member having a first portion, e.g., a first end, attachable to at least one of the mounting feature and the first elongate securing member. In some examples, the first portion of the support member is attachable to the first mounting point. In some examples, the first portion of the support member and the first fixing point of the securing member are attachable to the first mounting point. In some examples, the first portion of the support member is attachable to one of the first mounting point and the second mounting point, and the first fixing point of the securing member is attachable to the other of the first mounting point and the second mounting point. The support member comprises a second portion, e.g., a second end. The second portion of the support member may be configured to engage the elongate member, e.g., a portion of the elongate member remote from the fixing point, e.g., remote from the point at which the elongate member is attached to the vehicle body, in an assembled configuration. The second portion may be configured to engage a wall, e.g. a side wall, of the fuel tank, e.g., at a point remote from the fixing point, in an assembled configuration. In some examples, a single fastener may be used to secure the first securing member and the support member to the mounting feature of the vehicle.

According to a second example in accordance with an aspect of the invention, there is provided a fuel tank assembly. The fuel tank assembly secures a vehicle fuel tank to a vehicle. The fuel tank assembly comprises a fuel tank and an elongate securing member having at least a first fixing point attachable to a vehicle body, e.g., a mounting feature of the vehicle body. The elongate securing member extends at least partially around the fuel tank in an assembled configuration. The assembly further comprises a support member, which has a first portion attachable to the vehicle body, e.g., the mounting feature of the vehicle body, and a second portion configured to engage at least one of the elongate member and a wall, e.g. a side wall, of the fuel tank, e.g., at a point remote from the fixing point, in an assembled configuration.

According to a third example in accordance with an aspect of the invention, there is provided a vehicle comprising a fuel tank mounting assembly and fuel tank. In particular, the vehicle comprises a body portion having a mounting feature and a vehicle fuel tank mounting assembly configured to secure a vehicle fuel tank to the vehicle. The mounting assembly comprises an elongate securing member having at least a first fixing point attachable to the mounting feature of the vehicle. The elongate securing member extending at least partially around the fuel tank in an assembled configuration. The mounting assembly further comprises a support member having a first portion attachable to the mounting feature and a second portion configured to engage the elongate member, e.g., at a point remote from the fixing point of the securing member, in an assembled configuration.

According to a fourth example in accordance with an aspect of the invention, there is provided a method of assembling a fuel tank to a vehicle, the method comprising: securing the fuel tank to the vehicle using an elongate securing member having at least a first fixing point attachable to a vehicle body, e.g., a mounting feature of the vehicle body, the elongate securing member extending at least partially around the fuel tank in an assembled configuration; and bracing the securing member using a support member having a first portion attachable to the mounting feature and a second end configured to engage at least one of the elongate member and a wall of the fuel tank, e.g., at a point remote from the fixing point.

According to a fifth example in accordance with an aspect of the invention, there is provided a fuel tank mounting system comprising a first fuel tank mounting assembly and a second fuel tank mounting assembly. The first fuel tank mounting assembly and the second fuel tank mounting assembly may cooperate to secure the fuel tank to the vehicle and protect the fuel tanks and/or other vehicle components from damage, e.g., during a collision. The first fuel tank mounting assembly and the second fuel tank mounting assembly may have different configurations. For example, the first fuel tank mounting assembly may comprise a first elongate securing member and a first supporting member attachable to a first mounting feature of the vehicle, e.g., to a single mounting point of the first mounting feature of the vehicle, using a common fastener. The second fuel tank mounting assembly may comprise a second elongate securing member and a second supporting member attachable to different mounting points of a second mounting feature, e.g., using separate fasteners. For example, the second elongate securing member may be attachable to a first mounting point of the second mounting feature, and the second supporting member may be attachable to a second mounting point of the second mounting feature.

In some examples, there may be a second elongate securing member configured to extend around a second portion of the fuel tank, in an assembled configuration. The second elongate securing member may be attachable to the mounting feature of the vehicle body, e.g., along with the first elongate securing member. For example, a single fastener may be used to secure at least one of the first securing member, the second securing member, and the support member to the mounting feature of the vehicle body. In some examples, the first elongate securing member and the second elongate securing member may cooperate to complete a perimeter of the fuel tank in an assembled configuration. For example, the first elongate securing member and the second elongate securing member may cooperate to substantially engage the perimeter of the fuel tank, in an assembled configuration. In some examples, the first and second securing members may be a unitary structure. In some examples, the second securing member may be attachable to the first securing member a point remote from the mounting feature of the vehicle. At least one of the first and second elongate securing members may be contoured to fit against, e.g., engage, a portion of the perimeter of the fuel tank.

In some examples, at least one of the first elongate securing member and the support member further comprises a retaining feature configured to limit relative movement (e.g., rotational movement about the first fixing point) between the first elongate securing member and the support member. The retaining feature may comprise one or more of: a ridge extending at least partially along the length of the first elongate securing member; a substantially width-wise arc across the first elongate securing member and support member; a pin and hole arrangement. In this way, the retaining feature aims to support in securing the support member within a footprint of the first elongate securing member to restrict any rotation of the support member relative to the first elongate securing member, e.g., during a collision.

In some examples, a bottom surface of the vehicle fuel tank may define a first transverse plane of the vehicle in an assembled configuration. In some examples, the mounting feature may be located at a second transverse plane of the vehicle. In these examples, and those described further herein, additional features and the benefit of those features may be understood based on at least one of these planes of geometry. For instance, in some examples, the support member may extend between the first transverse plane and the second transverse plane, e.g., in a straight line shortest distance vector, thus minimizing free length. In some examples, at least one of the first elongate securing member, second elongate securing member and the support member may be contoured to fit against at least a first portion of a perimeter of the fuel tank that lies between the first and second transverse planes, in an assembled configuration. In this manner, the fuel tank mounting assembly fits closely to the fuel tank and covers as much of the perimeter as possible to, in effect, "hug" the fuel tank and enable effective load transfer from the fuel tank to the body of the vehicle, e.g., under forward loading of the fuel tank. In this way, any forces from the fuel tank are more efficiently transferred through the fuel mounting assembly and into the vehicle body.

In some examples, at least one of the first and second elongate securing members may extend away from the first fixing point towards the fuel tank in a direction in or parallel to the second transverse plane of the vehicle. In some examples, the support member may extend away from the first fixing point towards to the fuel tank in a direction inclined to the second transverse plane of the vehicle.

In some examples, the mounting feature may be offset from a side wall of the fuel tank by a distance greater than approximately 30 mm in an assembled configuration.

In some examples, the support member may comprise a block of material configured to at least partially fill a space bounded by a side wall of the fuel tank, the first transverse plane and the second transverse plane, in an assembled configuration. Filling the space provides a better transfer of forces from the fuel tank to the vehicle body. The mounting assembly may be fabricated from steel or other such viable materials such as foam, plastic or metal frames. In some examples, the first and/or second elongate securing member may be, and the support member may be, formed from the same material. In some examples, the first and/or second elongate securing member may be formed from a different material from the support member.

In the examples of the present disclosure, the number of fasteners used to secure the fuel tank can be minimized. In particular, the present disclosure may provide additional support of the fuel tank without increasing the number of fasteners and/or mounting points on the vehicle, e.g., compared to a fuel tank mounting assembly having separate support structure. In addition, the mounting assembly according to the present disclosure can be kept lightweight and made to fit within existing packaging requirements, ultimately providing a lower cost and retrofittable assembly that still achieves the desired effect of improving crash safety.

For the avoidance of doubt, the fuel tank mounting assembly according to any of the examples described herein may be used to improve the crash safety performance of a vehicle under any appropriate type of loading condition. Whilst the benefits of the fuel tank mounting assembly may be described by reference to frontal and/or side collision, it is understood that the benefits of the present disclosure are not limited to such types of collisions.

These examples and other aspects of the invention will be apparent from and elucidated with reference to the example(s) described hereinafter. It should also be appreciated that particular combinations of the various examples and features described above and below are often illustrative and any other possible combination of such examples and features are also intended, notwithstanding those combinations that are clearly intended as mutually exclusive.

BRIEF DESCRIPTION OF THE DRAWINGS

The above and other objects and advantages of the disclosures herein will be apparent upon consideration of the following detailed description, taken in conjunction with the accompanying drawings, in which.

DETAILED DESCRIPTION

It should be understood that the detailed description and specific examples herein, while indicating exemplary embodiments, are intended for purposes of illustration only and are not intended to limit the scope of the invention. These and other features, aspects, and advantages of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Figure 1:
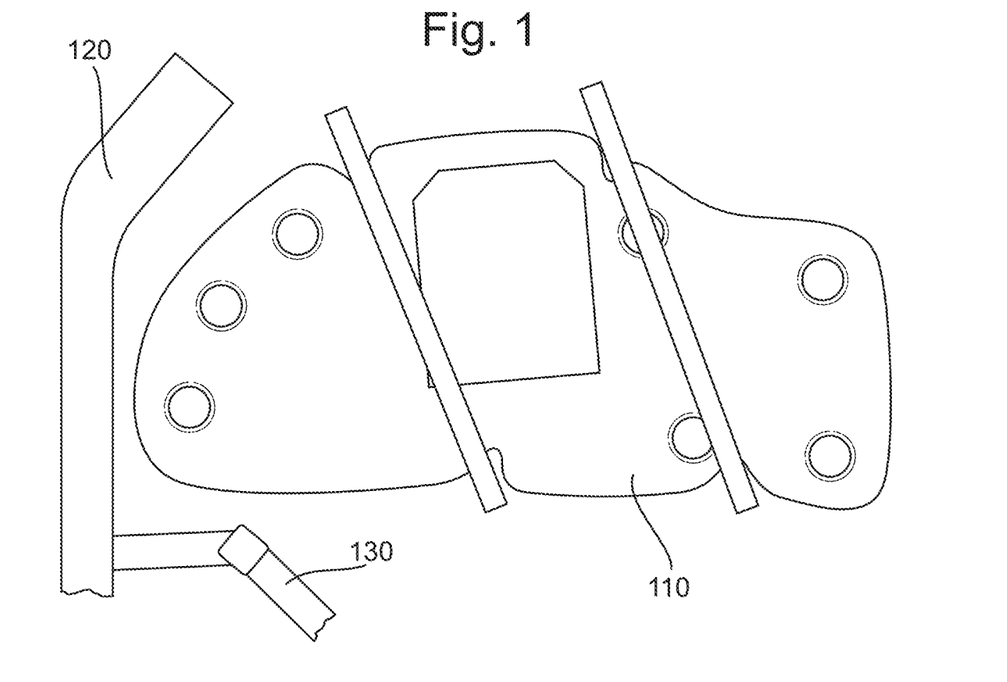
FIG. 1. illustrates an example fuel tank mounted on the underside of a vehicle in a static design position.

FIG. 1 shows a typical fuel tank 110 of a vehicle (not shown). The vehicle may be any appropriate type of vehicle, such as an automobile, a motorbike, a marine vessel or an aircraft. In particular, the vehicle may be a Plug-in Hybrid Electric Vehicle (HEV), or any other vehicle having a fuel tank and a battery pack. All HEVs use two or more distinct types of means to store energy, such as batteries to store electrical energy and gasoline/diesel to store chemical energy. The basic principal of HEVs is that the different types of motors have diverse efficiencies under different conditions, such as top speed, torque or acceleration and therefore switching from one type of motor to another yields greater efficiencies than either one could have their own. Therefore, HEVs can lead to greater fuel efficiency. For a Plug-in Hybrid Electric vehicle, for example, the fuel tank 110 of the vehicle may be relocated from its typical position towards the front of the vehicle, which is near a subframe 120 and an exhaust 130, e.g., to make space at the rear of the vehicle for the battery pack. While this relocation of the fuel tank 110 to the front of the vehicle allows for a larger battery pack, and thus greater electrical energy storage, it is important to ensure the fuel tank 110 is secured to prevent unseating of the fuel tank 110, e.g., during extreme loading experience during frontal collision.

Figure 2:
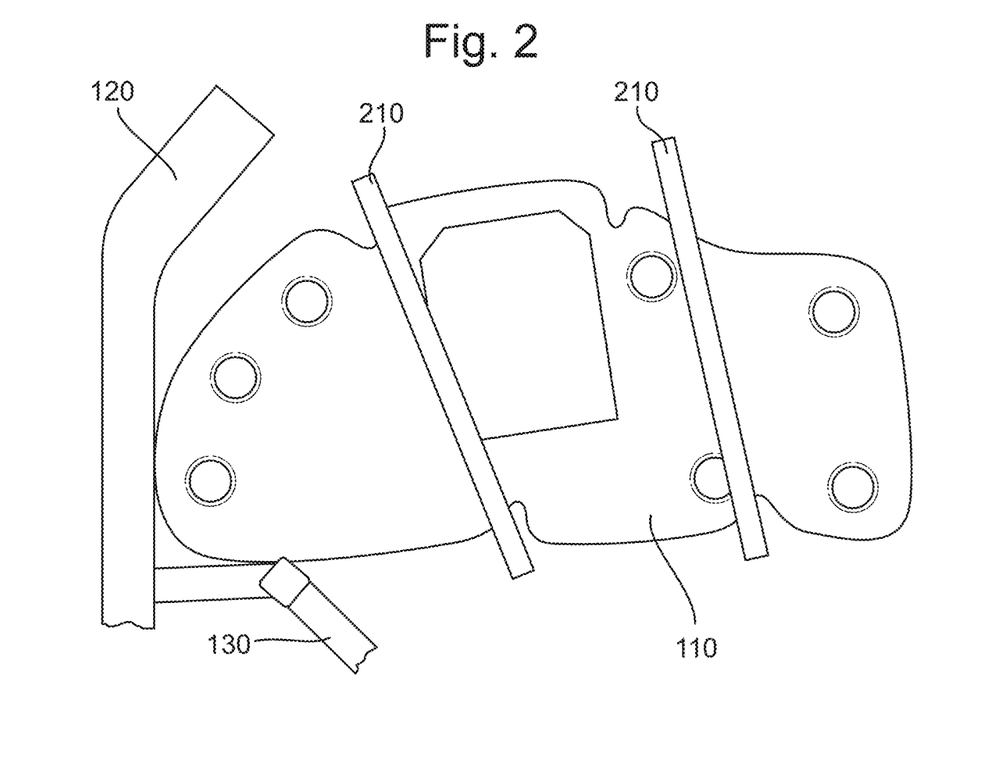
FIG. 2. illustrates an example fuel tank that has come into contact with other components mounted on the underside vehicle after becoming unseated.

FIG. 2 is a schematic view of a fuel tank 110 of a vehicle (not shown). The example illustrated shows a fuel tank 110 that has shifted forward and is in contact with the subframe 120 and exhaust 130. It is possible for the fuel tank 110 to surge forward as illustrated due to the fluid momentum and slosh effect of the contents of fuel tank 110. For example, in a frontal or side impact crash, the deceleration impulse of the vehicle is larger than the deceleration impulse of the liquid fuel in the fuel tank 110, which causes the fluid to slosh against the fuel tank 110 and impart its kinetic energy and momentum to the fuel tank 110. The liquid fuel may be, for example, one or more of gasoline, diesel, ethanol, and the like. The fuel tank 110 may include a fuel delivery module which may include a fuel pump. The fuel pump may be connected to fuel lines to deliver the liquid fuel to an engine. The fuel system as formerly described provides additional mass and strain on the fuel tank straps 210 of the fuel tank 110 which adding to likelihood of twisting of the fuel tank straps 210, allowing room for the fuel tank 110 to move.

Figure 3:
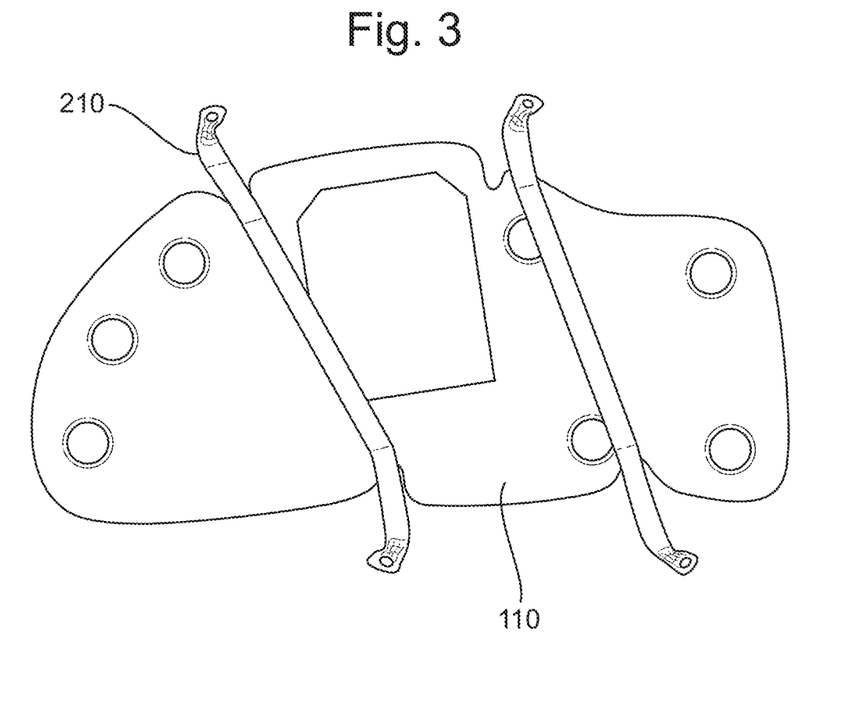
FIG. 3 illustrates a 3D perspective view of a mounting assembly of a fuel tank, wherein the mounting assembly has undergone a high amount of strain.

FIG. 3 is a view of a conventional fuel tank strap 210, wherein the strap 210 has undergone a high amount of strain, e.g., as a result of a frontal crash. The fuel tank straps 210 have been twisted because the locations at which the fuel tank straps 210 attach to the vehicle body are offset, e.g., in a lateral direction, from the side walls of the fuel tank 110, resulting in the fuel tank straps 210 not fitting closely along the perimeter of fuel tank 110 sufficient enough to retain the fuel tank 110 from moving during sudden impact.

Currently, it is known to utilize a support structure separate from the strap 210, e.g., a frontal blocker (not shown), to address fuel tank 110 surge. These blockers tend to be very large and comprise multiple additional attachments to the body structure. Due to cantilever effects from the floor of the vehicle, the blockers tend to bend or rotate in a collision, which results in current solutions being large in size and overly stiff to stop the mass of fuel tank 110 from moving in a collision event.

Figure 4:
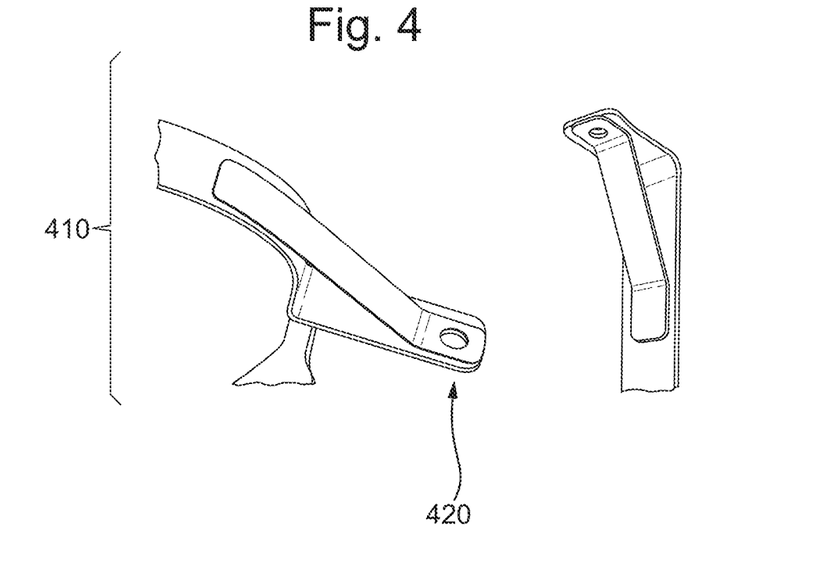
FIG. 4 illustrates a close-up view of an example mounting assembly in accordance with at least one of the examples described herein.

FIG. 4. illustrates a close-up view of an example fuel tank mounting assembly 410 according to the present disclosure that minimizes fuel tank surge. The vehicle fuel tank mounting assembly 410 is configured to secure a vehicle fuel tank 110 to a vehicle using a fixing point 420, which attaches to a mounting feature of the vehicle. The mounting feature may be on an underside of the vehicle (not shown) or any such suitable surface known to be sufficient for mounting a fuel tank 110 and mounting assembly 410, such as a subframe 120 of the vehicle or cross supports (not shown). The fixing point 420 may be suitably adapted to receive commonly used fasteners such as nuts, bolts and other more specialized fixings such as welds, for example. The mounting feature of the vehicle may have any configuration appropriate for attachment of the mounting assembly 410 to the vehicle body by virtue of fixing point 420. For example, the mounting feature may comprise one or more separate mounting points, e.g., threaded holes, configured to receive respective fasteners.

Figure 5A:
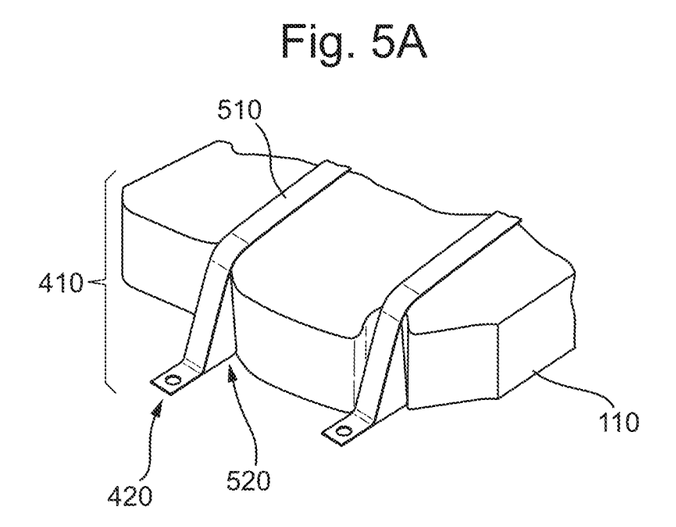
FIGS. 5A and 5B illustrates an example fuel tank and mounting assembly in accordance with at least one of the examples described herein.

FIG. 5A illustrates an example fuel tank and mounting assembly in accordance with at least one of the examples described herein. The fuel tank mounting assembly 410 may comprise a first elongate securing member 510 having at least a first fixing point 420 attachable to a vehicle body, the elongate securing member 510 extending at least partially around the fuel tank 110 in an assembled configuration; and a support member 520 having a first end attachable to the first fixing point 420 and a second end configured to engage the elongate member at a point remote from the fixing point 420. Additionally or alternatively, the second end of the support member 520 may be configured to engage a wall of the fuel tank 110.

The elongate securing member 510 and the support member 520 are both attached at the same mounting feature on the vehicle body. In some examples, it is the elongate securing member 510 that fits much closer to the fuel tank 110 and not the support member 520, as will be shown in more detail with reference to FIG. 7B. In other examples, the support member 520 is configured to engage with the wall of the fuel tank 110, in this way, the vehicle fuel tank mounting assembly 410 'hugs' the fuel tank 110 and enables better load transfer of any forces from the fuel tank 110 to the vehicle body, reducing movement of the fuel tank 110 itself during movement.

Figure 5B:
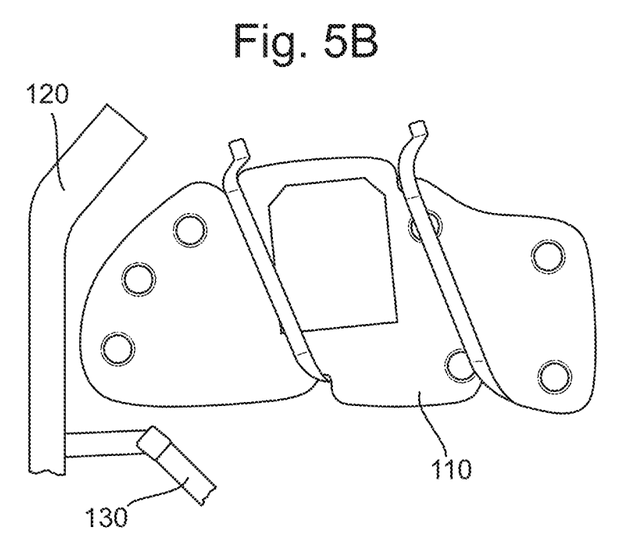

FIG. 5B illustrates an example fuel tank that has remained seated during a collision at least partially due to the mounting assembly 410. As shown, some of the examples herein do not require an increase in the number of fasteners used to secure the securing members to the mounting feature on the body/support structure of the vehicle. The utilization of the mounting assembly 410 and add-on support members 520 may demonstrate a similar anti-surge result as larger bulky frontal blockers. At least some examples have the advantages of lower cost, lower weight and are compatible with existing HEV platforms. Many examples herein are compatible with the existing mounting features on the underside of a vehicle (as shown with reference to FIGS. 7A-9).

Figure 6:
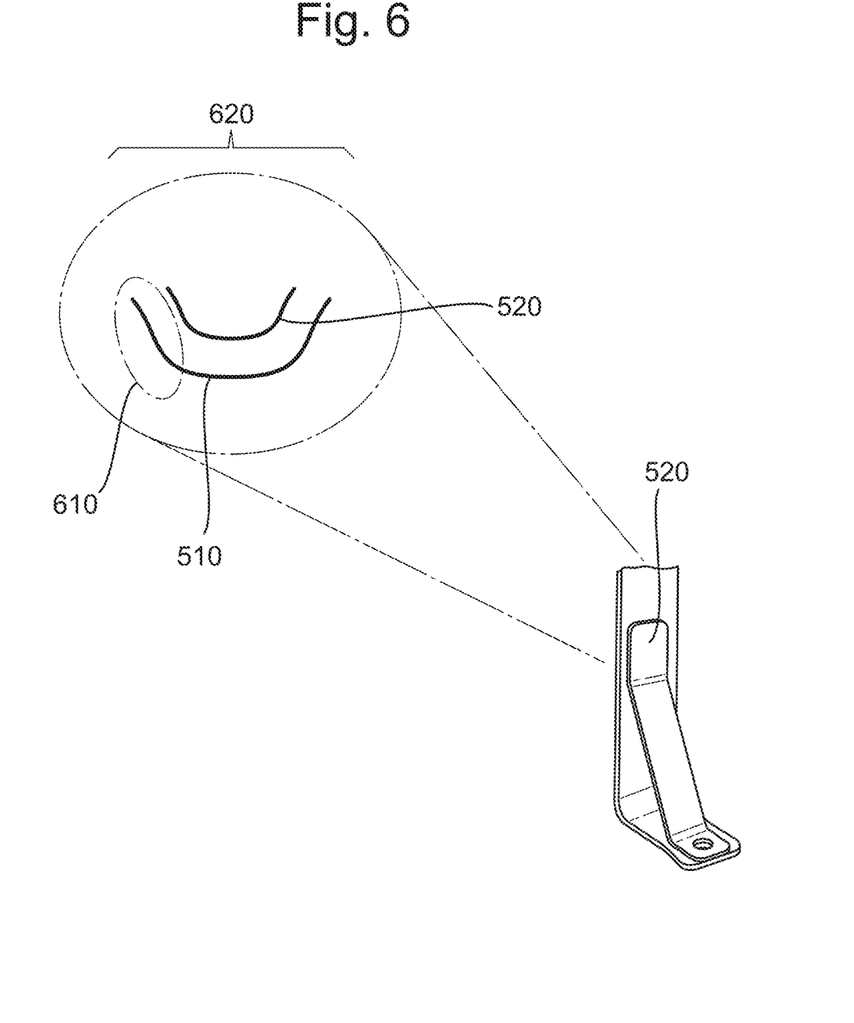
FIG. 6 illustrates a cross-sectional view of an example mounting assembly in accordance with at least one of the examples described herein.

FIG. 6 illustrates a cross-sectional view of an example mounting assembly. As illustrated, at least one of the first elongate securing member 510 and the support member 520 may comprise a retaining feature configured to limit relative movement between the first elongate securing member 510 and the support member 520 (e.g., rotation movement about the first fixing point 420). The retaining feature may comprise one or more of: a ridge 610 extending at least partially along the length of the first elongate securing member 510; a substantially width-wise arc 620 across the first elongate securing member 510 and support member 520; or a pin and hole/slot arrangement (not shown). These retaining features help in securing the support member 520 within a footprint of the first elongate securing member 510, e.g., to restrict rotation of the support member 520 relative to the first elongate securing member 510, e.g., as the fuel tank 110 surges forward.

Figure 7A:
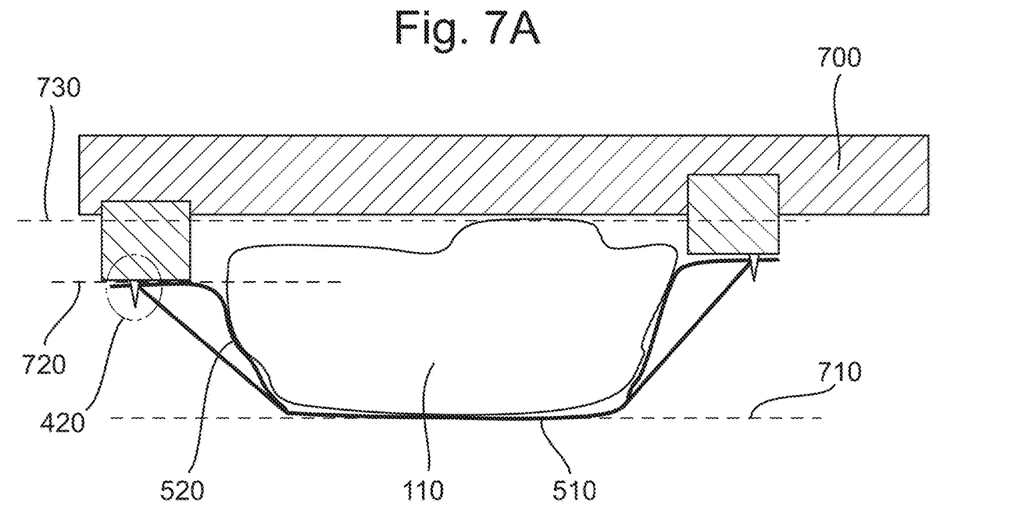
FIG. 7A—7C illustrate example fuel tank and mounting assemblies mounted on the underside of a vehicle in accordance with at least one of the examples described herein.

FIG. 7A illustrates an example fuel tank 110 and mounting assembly assembled to the underside of a vehicle 700. In accordance with an aspect of the invention, there is provided a fuel tank assembly 410, the fuel tank assembly comprising: a fuel tank 110; an elongate securing member 510 having at least a first fixing point 420 attachable to a mounting feature of a vehicle body 700, the elongate securing member 510 extending at least partially around the fuel tank 110 in an assembled configuration; and a support member 520 having a first end attachable to the first fixing point 420 and the mounting feature, and a second end configured to engage at least one of the elongate securing member 510 and a wall of the fuel tank 705 at a point remote from the fixing point 420.

Figure 7B:
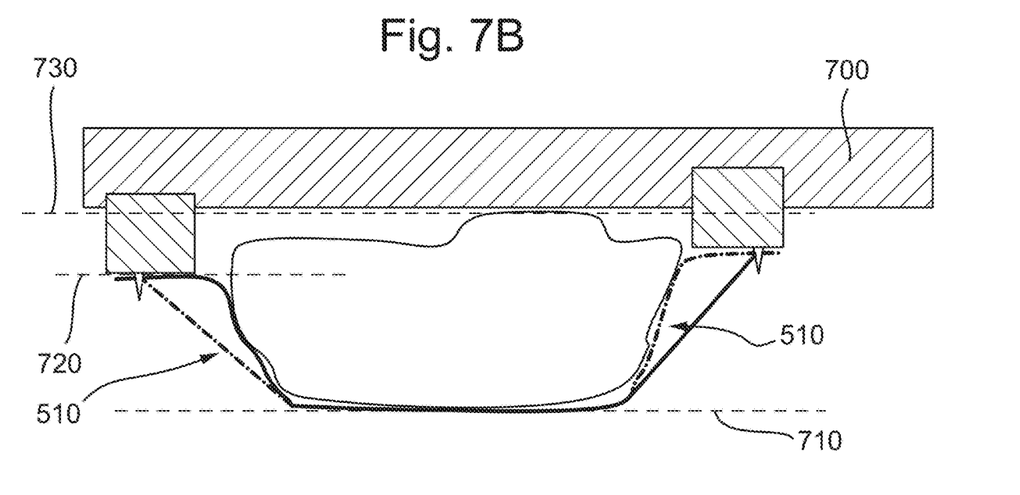

In the example shown in FIGS. 7A and 7B, a number of planes of geometry are shown. For example, a bottom surface of the vehicle fuel tank 110 defines a first transverse plane 710 of the vehicle in an assembled configuration; and the mounting feature is located at a second transverse plane 720 of the vehicle and offset from a side wall of the fuel tank 110. In some examples, the elongate securing member 510 extends between the first transverse plane 710 and the second transverse plane 720 in a straight line shortest distance vector, e.g., based on the location of the mounting feature relative to the fuel tank 110. In other examples the support member 520 extends between the first transverse plane 710 and the second transverse plane 720 in a straight line shortest distance vector, e.g., based on the location of the mounting feature relative to the fuel tank 110. The straight line shortest distance vector minimizes free length of the tank mounting assembly 410. Some examples describe the elongate securing member 510 being contoured to at least a first portion of a perimeter of the fuel tank 110 that lies within the first transverse plane 710 and second transverse plane 720 in an assembled configuration. The contouring of mounting assembly to the fuel tank 110 allows the mounting assembly 410 to fit closely to the fuel tank 110 and cover as much of the perimeter of the fuel tank 110 as possible to, in effect, "hug" the fuel tank 110 and enable load transfer from the fuel tank 110 to the body of the vehicle. In this way, any forces from the fuel tank 110 are more efficiently transferred through the fuel mounting assembly 410 and into the vehicle body. Additionally or alternatively, the support member 520 may be contoured to the perimeter of the fuel tank 110 that lies within the first transverse plane 710 and the second transverse plane 720.

In some examples, the fuel tank 110 is attached to the fuel tank mounting assembly 410, by multiple fixings along the surface of the fuel tank 110 (i.e. by welds, nuts, bolts, screws or the like). In other examples, the contouring of the fuel tank mounting assembly 410 provides enough frictional force between the elongate securing member 510 and the surface of the fuel tank 110 to prevent the fuel tank 110 from slipping.

In some examples, a top surface of the vehicle fuel tank 110, defines a third transverse plane 730 of the vehicle. As will be described more with reference to FIG. 8, in some examples, a second elongate securing member 810 extends over a second portion of the perimeter of the fuel tank 110 between the second transverse plane 720 and the third transverse plane 730. Indeed, examples include the features above, with reference to the first transverse plane 710 and second transverse plane 720, between the second transverse plane 720 and third transverse plane 730. For example, the contouring of the elongated securing member 510 and/or support member 520 to the fuel tank 110 is also possible between the second transverse plane 720 and the third transverse plane 730. In addition, the elongate securing member 510 may also extend between the second transverse plane 720 and the third transverse plane 730 in a straight line shortest distance vector. Additionally or alternatively the support member 520 may extend between the second transverse plane 720 and the third transverse plane 730 in a straight line shortest distance vector.

FIG. 7B illustrates an example fuel tank and mounting assembly mounted on the underside 700 of a vehicle. In some examples, the elongate securing member 510 extends away from the mounting feature towards the fuel tank 110 in a direction in, or parallel to, the second transverse plane 720 of the vehicle. In some examples, the support member 520 extends away from the mounting feature towards the fuel tank 110 in a direction inclined to the second transverse plane 720 of the vehicle.

In some examples, the support member 520 extends away from the mounting feature towards to the fuel tank 110 in a direction in, or parallel to, the second transverse plane 720 of the vehicle, rather than the elongate securing member 510. In some examples, the elongate securing member 510 extends away from the mounting feature towards to the fuel tank 110 in a direction inclined to the second transverse plane 720 of the vehicle. As shown in FIG. 7B, the elongate securing member 510 may either extend away from the mounting feature in a direction parallel to the second transverse plane 720, or extend away from the mounting feature in a direction inclined to the second transverse plane 720. It is shown that the support member 520 may either extend away from the mounting feature in a direction inclined to the second transverse plane 720 or extend away from the mounting feature in a direction inclined to the second transverse plan 720. In this way, the support member 520 may be retrofittable to a fuel tank mounting assembly 410 as either the portion which fits closely to a wall of the fuel tank 110 or in a shortest distance vector. In practice, the method of manufacture of a conventional fuel tank strap need not be changed and can be retrofitted with a support member 520 as described herein.

In some examples, the mounting feature is offset from a side wall of the fuel tank 110 by a distance greater than approximately 30 mm in an assembled configuration.

Figure 7C:
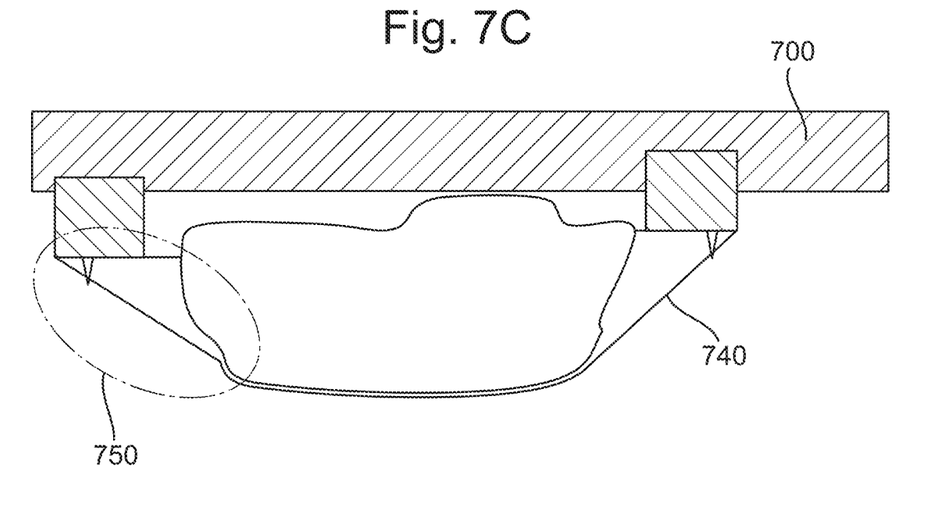

FIG. 7C illustrates an example fuel tank and mounting assembly mounted on the underside 700 of a vehicle. In some examples, the support member 520 comprises a block of material 740 configured to fill a space 750 bounded by a side wall of the fuel tank 110, the first transverse plane 710 and the second transverse plane 720 in an assembled configuration. The block of material 740 may comprise weight reducing or drag reducing features, such as holes which do not comprise the structural integrity of the block 740. In some examples, the elongate securing member 510 and the support member 520 may be provided as a unitary structure.

Figure 8:
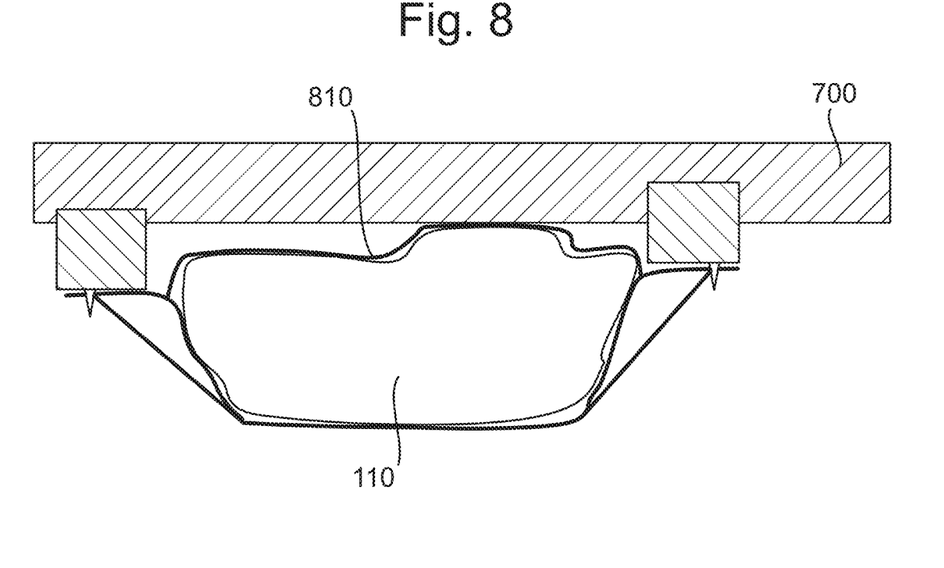
FIG. 8 illustrates a further example fuel tank and mounting assembly in accordance with at least one of the examples described herein.

FIG. 8 illustrates a further example fuel tank and mounting assembly in accordance with at least one of the examples described herein. The schematic illustration shows that, in some examples, there is a second elongate securing member 810 extending around a second portion of the fuel tank 110, in an assembled configuration. In one example, the second elongate securing member 810 is also attachable to the mounting feature of the vehicle body 700 along with the first elongate securing member 510. In some examples, the second elongate securing member 810 and first elongate securing member 510 complete a perimeter of the fuel tank 110 in an assembled configuration. In some examples, the second elongate securing member 810 may also be contoured to a second portion of the perimeter of the fuel tank 110. The second elongate securing member 810 is therefore configured to secure a vehicle fuel tank 110 on the underside 700 of a vehicle (not shown) or any other such suitable surface of a vehicle. In some examples, the second elongate securing member 810 does not require an increase in the number of fasteners used to secure the fuel tank mounting assembly 410 to the mounting feature of the vehicle. In some examples, the fuel tank 110 is attached to the fuel tank mounting assembly 410, by multiple fixings along the surface of the fuel tank 110 (i.e. by welds, nuts, bolts, screws or the like) to the first elongate securing member 510 or second elongate securing member 810. In other examples, the contouring of the fuel tank mounting assembly 410 provides enough frictional force between the first elongate securing member 510, second elongate securing member 810 and the surface of the fuel tank 110 to prevent the fuel tank from slipping/urging under force.

In some examples, the second elongate securing member 810 may be an additional piece added to the first elongate securing member 510, as described in some of the examples above. In other examples, the first elongate securing member 510 and second elongate securing member 810 may be a unitary piece, extending around the perimeter of the fuel tank 110. The support member 520 may be attached to the first and second elongate securing members, 510 and 810, to form the fuel tank mounting assembly 410.

Figure 9:
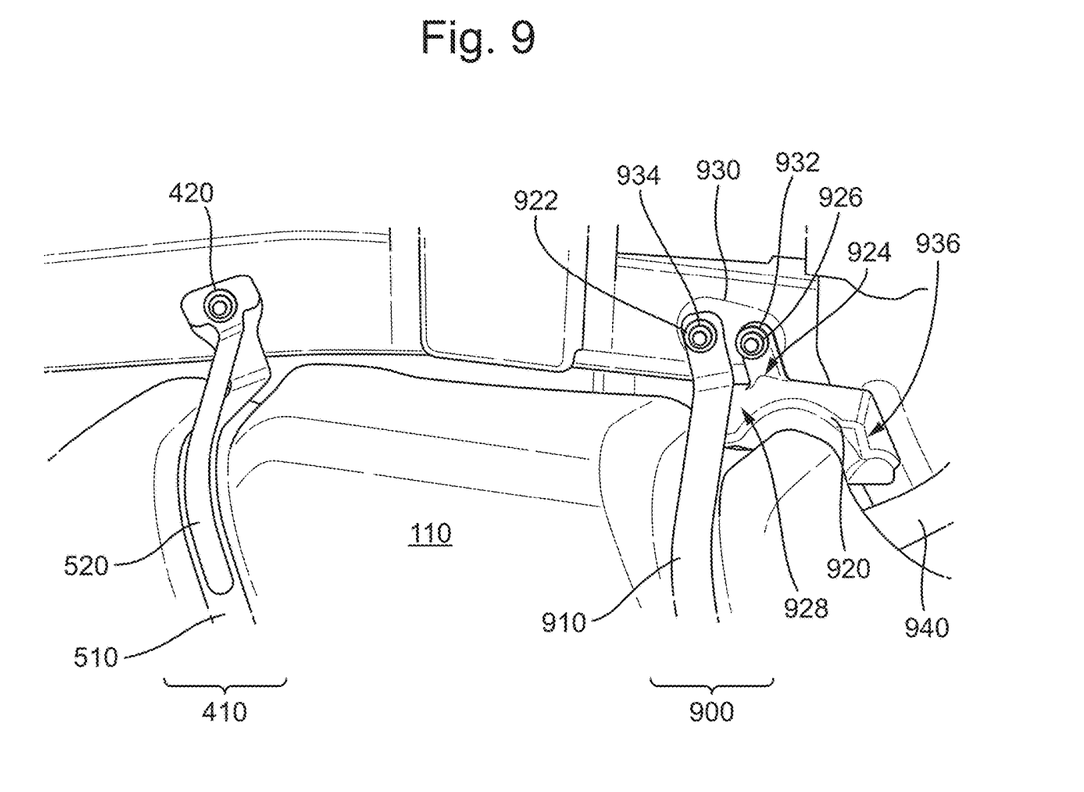
FIG. 9 illustrates a 3D perspective view of a mounting assembly in accordance with at least one of the examples described herein.

FIG. 9 illustrates a 3D perspective view of a fuel tank 110 located on the underside of a vehicle. In the example shown in FIG. 9, the fuel tank 110 is attached to the underside 700 of the vehicle by virtue of a first fuel tank mounting assembly 410 and a second fuel tank mounting assembly 900, although any appropriate number of fuel tank mounting assemblies may be used. In FIG. 9, the first fuel tank mounting assembly 410 is similar to that shown in FIG. 4, which is shown for illustration purposes only on the left-hand side of FIG. 9. The second fuel tank mounting assembly 900, which is shown for illustration purposes only on the right-hand side of FIG. 9, comprises elongate securing members 910 having a first fixing point 922 attachable to a first mounting point 934 of mounting feature 930, e.g., by virtue of a first fastener. The second fuel tank mounting assembly 900 comprises support member 920, having a first portion 924 with a second fixing point 926 attachable to a second mounting point 932 of mounting feature 930, e.g., by virtue of a second fastener. Support member 920 has a second portion 928 extending away from the first portion 924 and into a space bounded, in part, by a side wall of the fuel tank 110, the vehicle floor and elongate securing member 910.

In some examples, the support member 920 may be fabricated from metal and/or other such viable materials such as foams and plastics. In examples where the support member 920 is made from a material with different material properties than the material of the elongate securing member 910, the support member 920 and the securing member 910 may be attached to the vehicle using different mounting points, as shown by mounting points 932 and 934. This is because different materials often have different torque requirements for fixing to a vehicle body, and hence the same fastener cannot be used for both components, since over-torqueing can cause damage to either the elongate securing member 910 or support member 920. However, as shown with the previous examples, the elongate securing member 910 and support member 920 may be attached to the mounting feature 930 using a single fastener. It may be beneficial to use a single fastener where the elongate securing member 910 and support member 920 are made from the same material (or materials having similar material properties). Conversely, where the material properties of the elongate securing member 910 and support member 920 are sufficiently dissimilar, separate mounting points may be preferred.

In the example shown in FIG. 9, the support member 920 comprises a third portion 936 extending away from the first and second portions 924, 928, e.g., around a corner of fuel tank 110. The third portion 936, or indeed any other additional portion of the support member 920 may be beneficial in protecting other vehicle components from damage, e.g., upon a collision. For example, a fuel tank filler line 940 may become damaged during a side impact. While the fuel tank mounting assembly 410 and/or fuel tank mounting assembly 900 are effective in reducing movement of the fuel tank 110 upon side impact as well as front impact, protection for additional components, such as fuel filler line 940, is provided by the third portion 936 of support member 920. For example, support member 920 may be configured to deform around fuel filler line 940, protecting it from impact by an intruding portion of body structure, e.g., during movement of the fuel tank 110 cause by an impact event. In some examples, support member 920 is easily deformable, e.g., mouldable, if created out of a volume filler foam, such as expanded polypropylene (EPP) foam. In such a case, it may be beneficial for support member 920 to not share a common fastener location due to the allowable bolt torques for the respective materials.

Figure 10:
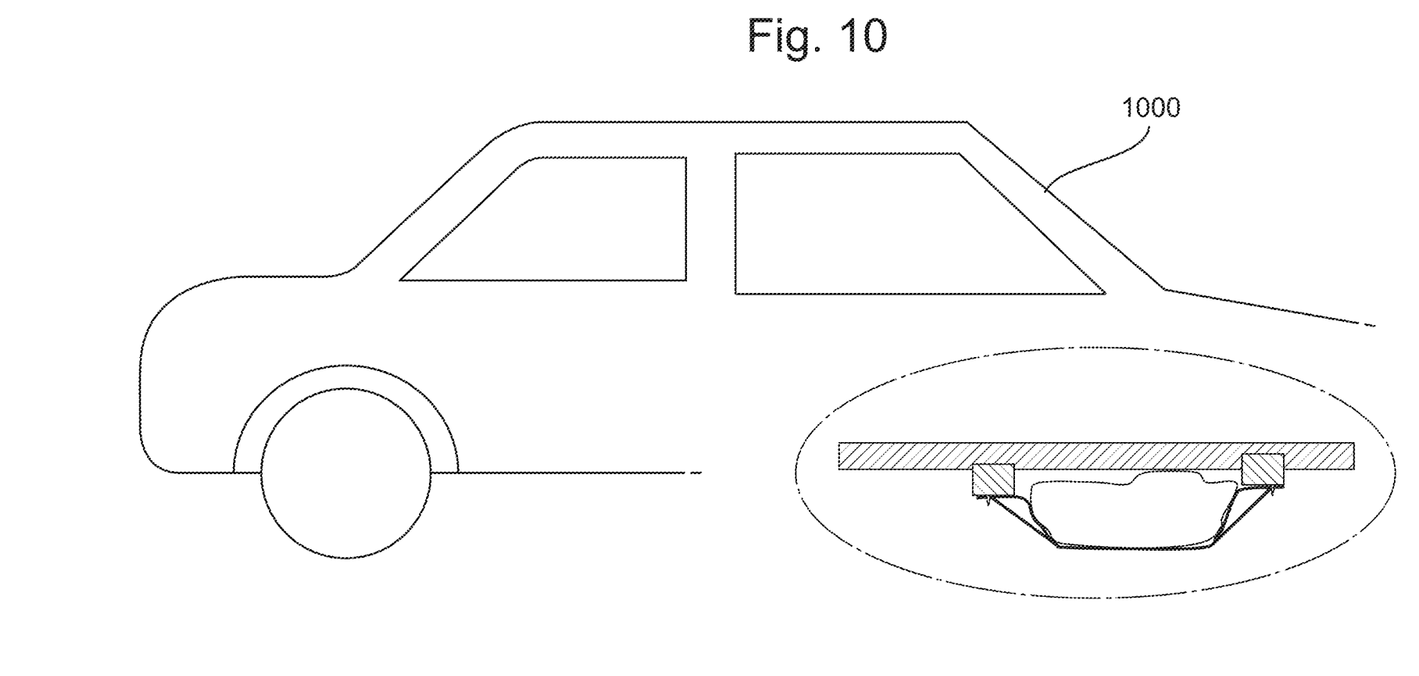
FIG. 10 illustrates a cut-away of an example vehicle, fuel tank and mounting assembly in accordance with at least one of the examples described herein.

FIG. 10 illustrates a partial cut-away of an example vehicle 1000, fuel tank 110 and mounting assembly 410 in accordance with at least one of the examples. According to some examples there is provided a vehicle 1000 comprising: a body portion having a mounting feature; and a vehicle fuel tank mounting assembly 410 configured to secure a vehicle fuel tank 110 to the vehicle, the assembly comprising: an elongate securing member 510 having at least a first fixing point 420 attachable to the mounting feature of the vehicle, the elongate securing member 510 extending at least partially around the fuel tank 110 in an assembled configuration; and a support member 520 having a first end attachable to the mounting feature and the first fixing point 420 and a second end configured to engage the elongate member 510 at a point remote from the fixing point 420.

According to some examples, there is provided a method of assembling a fuel tank 110 to a vehicle 1000, the method comprises securing the fuel tank 110 to the vehicle using an elongate securing member 510 having at least a first fixing point 420 attachable to a vehicle body, the elongate securing member 510 extending at least partially around the fuel tank 110 in an assembled configuration. The method further comprises bracing the securing member 510 using a support member 520 having a first end attachable to the first fixing point 420 and a second end configured to engage at least one of the elongate member 510 and a wall of the fuel tank 110 at a point remote from the fixing point 420.

In some examples, the entire fuel tank mounting assembly 410 and fuel tank 110, are located at a front portion of the vehicle 1000. However, in some vehicles 1000, it is common to locate the fuel tank 110 near the engine (not shown), which it supplies with the liquid fuel contained within the fuel tank 110. Therefore, the fuel tank mounting assembly 410 and fuel tank 110 may be better located in the middle, or towards the rear, of the vehicle.

It should be understood that the examples described above are not mutually exclusive with any of the other examples described with reference to FIGS. 1-10. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The disclosure of this invention is made for the purpose of illustrating the general principles of the systems and processes discussed above and are intended to be illustrative rather than limiting. More generally, the above disclosure is meant to be exemplary and not limiting and the scope of the invention is best determined by reference to the appended claims. In other words, only the claims that follow are meant to set bounds as to what the present disclosure includes.

While the present disclosure is described with reference to particular example applications, shall be appreciated that the invention is not limited hereto. It will be apparent to those skilled in the art that various modifications and improvements may be made without departing from the scope and spirit of the present invention. Those skilled in the art would appreciate that the actions of the processes discussed herein may be omitted, modified, combined, and/or rearranged, and any additional actions may be performed without departing from the scope of the invention.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A vehicle fuel tank mounting assembly configured to secure a vehicle fuel tank to a vehicle, the assembly comprising:
a first elongate securing member having at least a first fixing point attachable to a mounting feature of a vehicle body, the elongate securing member extending at least partially around the fuel tank in an assembled configuration; and
a support member having a first end attachable to the first fixing point and a second end configured to engage at least one of the elongate member and a wall of the fuel tank.

2. The vehicle fuel tank mounting assembly of claim 1, further comprising:
a second elongate securing member extending around a second portion of the fuel tank in an assembled configuration, wherein the second elongate securing member is attachable to the mounting feature.

3. The vehicle fuel tank mounting assembly of claim 2, wherein the second elongate securing member and first elongate securing member complete a perimeter of the fuel tank in an assembled configuration.

4. The vehicle fuel tank mounting assembly of claim 1, wherein at least one of the first elongate securing member and the support member further comprises a retaining feature configured to limit relative moment between the first elongate securing member and the support member.

5. The vehicle fuel tank mounting assembly of claim 4, the retaining feature comprising a ridge extending at least partially along the length of the first elongate securing member.

6. A fuel tank assembly, the fuel tank assembly comprising:
a fuel tank;
an elongate securing member having at least a first fixing point attachable to a mounting feature of a vehicle body, the elongate securing member extending at least partially around the fuel tank in an assembled configuration; and
a support member having a first end attachable to the first fixing point and a second end configured to engage at least one of the elongate member and a wall of the fuel tank.

7. A vehicle comprising:
a body portion having a mounting feature; and
a vehicle fuel tank mounting assembly configured to secure a vehicle fuel tank to the vehicle, the assembly comprising:
an elongate securing member having at least a first fixing point attachable to the mounting feature of the vehicle, the elongate securing member extending at least partially around the fuel tank in an assembled configuration; and
a support member having a first end attachable to the first fixing point and a second end configured to engage at least one of the elongate member and a wall of the fuel tank.

8. The vehicle of claim 7, wherein:
a bottom surface of the vehicle fuel tank defines a first transverse plane of the vehicle in an assembled configuration; and
the mounting feature is located at a second transverse plane of the vehicle.

9. The vehicle of claim 8, wherein the support member extends between the first transverse plane and the second transverse plane in a straight line shortest distance vector.

10. The vehicle of claim 8, wherein the elongate securing member is contoured to at least a first portion of a perimeter of the fuel tank that lies between the first and second transverse planes in an assembled configuration.

11. The vehicle of claim 8, wherein the elongate securing member extends away from the mounting feature towards the fuel tank in a direction in or parallel to the second transverse plane of the vehicle.

12. The vehicle of claim 8, wherein the support member extends away from the mounting feature towards to the fuel tank in a direction inclined to the second transverse plane of the vehicle.

13. The vehicle of claim 7, wherein the mounting feature is offset from a side wall of the fuel tank by a distance greater than approximately 30 mm in an assembled configuration.

14. The vehicle of claim 8, wherein the support member comprises a block of material configured to at least partially fill a space bounded by a side wall of the fuel tank, the first transverse plane and the second transverse plane in an assembled configuration.

* * * * *